(12) United States Patent
Miyamura et al.

(10) Patent No.: US 11,437,070 B1
(45) Date of Patent: Sep. 6, 2022

(54) REPOSITIONING USING CUT AND PASTE SEGMENTS

(71) Applicant: International Business Machines Corporation, Armonk, NY (US)

(72) Inventors: Tsuyoshi Miyamura, Yokohama (JP); Setsuko Masuda, Tokyo (JP); Mitsuhiro Nishida, Sagamihara (JP); Tatsuki Sawada, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/471,374

(22) Filed: Sep. 10, 2021

(51) Int. Cl.
*G11B 5/584* (2006.01)
*G11B 15/18* (2006.01)

(52) U.S. Cl.
CPC .................... *G11B 15/18* (2013.01)

(58) Field of Classification Search
CPC .......... G11B 5/584; G11B 5/55; G11B 5/588; G11B 27/36; G11B 20/18; G11B 5/52; G11B 15/093; G11B 15/46; G11B 15/52; G11B 15/43; G11B 5/5513; G06F 11/1451; G06F 3/065; G06F 3/0686; G06F 11/106; G06F 11/1464
USPC ................. 360/77.01, 77.12, 78.03
See application file for complete search history.

(56) References Cited

U.S. PATENT DOCUMENTS

| | | |
|---|---|---|
| 6,785,076 B1 | 8/2004 | Alva |
| 9,582,360 B2 | 2/2017 | Katagiri et al. |
| 9,594,642 B1 * | 3/2017 | Bentley ................. G06F 3/0619 |
| 10,147,458 B2 | 12/2018 | Bentley et al. |
| 11,056,140 B1 | 7/2021 | Miyamura et al. |

FOREIGN PATENT DOCUMENTS

JP          2000311470 A      11/2000

* cited by examiner

*Primary Examiner* — Nabil Z Hindi
(74) *Attorney, Agent, or Firm* — James L. Olsen

(57) ABSTRACT

Repositioning to a beginning of an area of a tape medium to which a reposition request is directed can be completed. Reading, as a part of an error recovery procedure (ERP), between a first dataset of the area and an $m^{th}$ dataset of the area, can be completed, where m is a number of datasets for which cut and paste multi segments are to be generated. Cut and paste segments for each of the datasets in a range from the first dataset and the $m^{th}$ dataset can be generated. A subset of datasets within the range of the first dataset to the $m^{th}$ dataset having readable dataset information table (DSIT) information can be determined. A determination can be made whether the target data position is included within the subset of datasets within the range of the first dataset to the $m^{th}$ dataset by reading the DSIT information.

20 Claims, 4 Drawing Sheets

REPOSITIONING USING CUT AND PASTE SEGMENTS

BACKGROUND

The present disclosure relates generally to the field of tape systems, and more particularly to locating data within tape systems.

Magnetic tape systems store digital information on magnetic tape. Magnetic tapes can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to a system, computer program product, and method for improving repositioning within a tape system. A reposition request for a target data position can be received. Repositioning to a beginning of an area of a tape medium to which the reposition request is directed can be completed. Reading, as a part of an error recovery procedure (ERP), between a first dataset of the area and an $m^{th}$ dataset of the area, can be completed, where m is a number of datasets for which cut and paste multi segments are to be generated. Cut and paste segments for each of the datasets in a range from the first dataset and the $m^{th}$ dataset can be generated. A subset of datasets within the range of the first dataset to the $m^{th}$ dataset having readable dataset information table (DSIT) information can be determined by analyzing the cut and paste segments. A determination can be made whether the target data position is included within the subset of datasets within the range of the first dataset to the $m^{th}$ dataset by reading the DSIT information.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
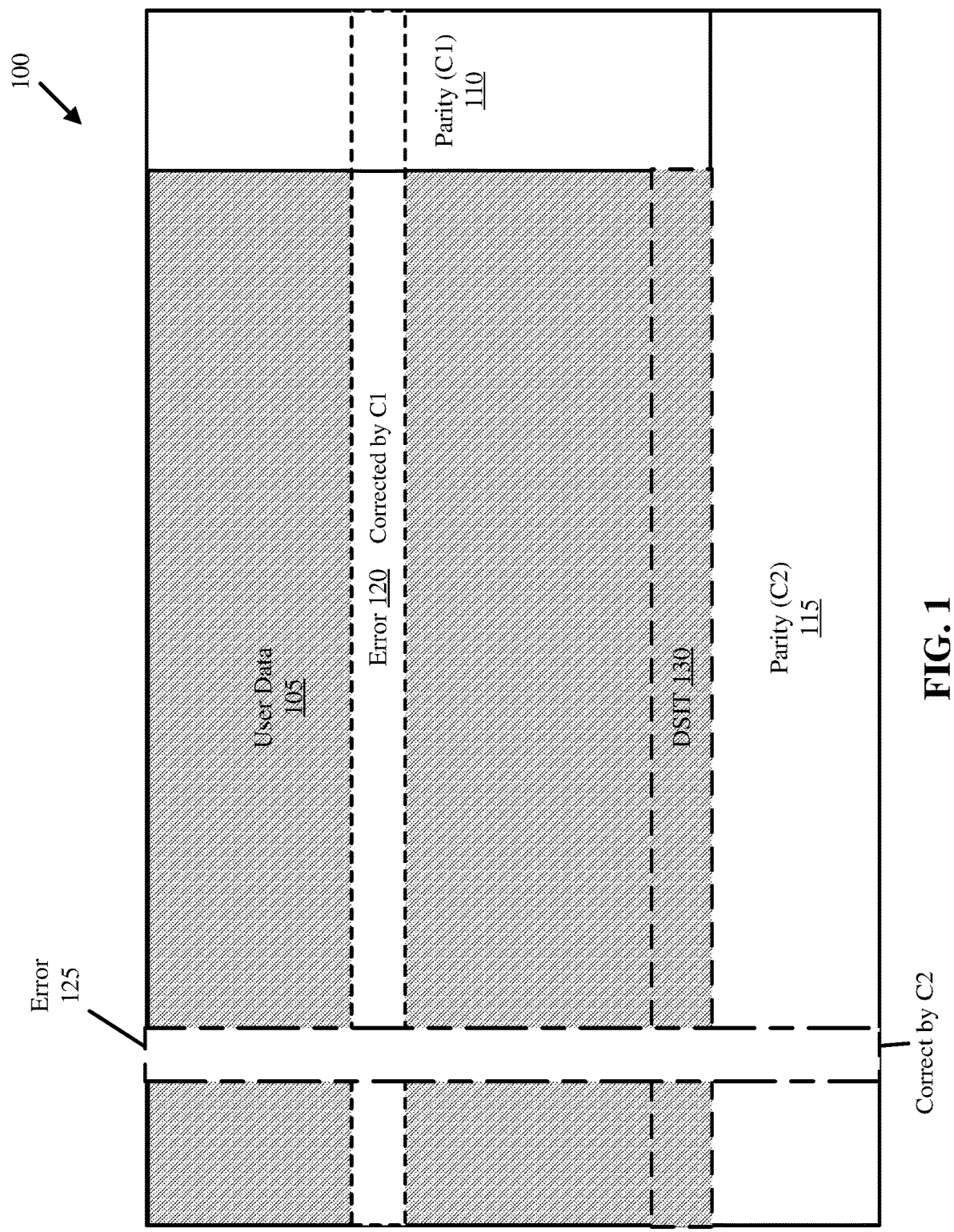
FIG. 1 is a block diagram illustrating an example dataset that can be read from a tape medium, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape storage, and more particularly to locating data within tape systems. While the present disclosure is not necessarily limited to such applications, various aspects of the disclosure may be appreciated through a discussion of various examples using this context.

Repositioning is a process in which a tape is wound to a target data position (e.g., a target block, record, or file mark (FM)) such that data can be written to or read from the tape starting at the target data position. In order for the tape to be repositioned to the target data position, a request to reposition is made with a record number or file mark (a partition of a file composed of many records) number indicating where the tape should be repositioned. The tape system then references a tape directory to find the target record and/or file mark (target data position). The tape directory utilizes a physical mapping of areas on the tape to record/file mark numbers to reposition the tape to the correct physical area on the tape. For example, a tape can have 272 wraps and each wrap can have 128 areas (or 272×128=34,816 total areas on the tape). Each area can be associated with a last record number and/or file mark number. In response to a reposition request, the area including the target record number or file mark can be identified as the physical location for repositioning. Upon repositioning to the correct area, datasets within the area can be read sequentially from the beginning until the target record or file mark is found. If the target record or file mark is found, then repositioning ends. However, if the target record or file mark is not found, the remaining area is continued to be read until the target record or file mark is found.

In some instances, if a target dataset cannot be read (e.g., due to repeated use of the tape medium, impurities adhering to the tape surface, deterioration due to corrosion, etc.), the tape drive may change settings (e.g., servo settings, channel settings, dataflow settings, etc.) and repeatedly re-read the same dataset to attempt to find the record and file mark range of the dataset. This process is known as an error recovery procedure (ERP). A single ERP re-read on a dataset can take approximately 3-5 seconds. However, not being able to locate a target data position is a critical issue, and as a result, the tape drive can repeat the ERP re-read 80 or more times to attempt to read a dataset successfully. If the target position cannot be found, the ERP will eventually return an error, or alternatively, the command will time out on the host side. Accordingly, complications exist where target data positions (e.g., records, file marks, and blocks) cannot be accurately located. Additionally, issues exist where error recovery procedures run for prolonged periods (e.g., over 20 minutes) to attempt locate the target data position.

Aspects of the present disclosure address the aforementioned complications by repositioning a tape system using cut and paste segments generated during an error recovery procedure (ERP). A reposition request for a target data position can be received. Repositioning to a beginning of an area of a tape medium for which the reposition request is directed to can be completed. Reading, as a part of an error recovery procedure (ERP), between a first dataset of the area and an $m^{th}$ dataset of the area as a part of a cut and paste multi operation, can be completed, where m is a number of datasets for which cut and paste multi segments are to be generated. Cut and paste segments for each of the datasets in a range from the first dataset and the $m^{th}$ dataset can be generated. A subset of datasets within the range of the first dataset to the $m^{th}$ dataset having readable dataset information table (DSIT) information can be determined by analyzing the cut and paste segments. A determination can be made whether the target data position is included within the subset of datasets within the range of the first dataset to the $m^{th}$ dataset by reading the DSIT information.

Aspects of the present disclosure provide several advantages. By using cut and paste segments generated during an ERP process, assurance can be made that the data which is being read to locate a target data position is valid. Further still, speed of repositioning can be increased as using DSITs of distinct datasets can be used to locate the target data position within a tape media without necessarily requiring the reading of each and every DSIT of each dataset within the target area. That is, if only one dataset having readable DSITs is identified based on generated cut and paste segments, this may be sufficient to locate the target data position. This can remove the need for repeated (and potentially failed) ERP cycles to attempt to locate a target data position and thereafter reposition the tape medium.

Referring now to FIG. 1, shown is a dataset 100 structure, in accordance with embodiments of the present disclosure. The dataset 100 includes user data 105, a first parity 110 (C1), and a second parity 115 (C2).

The user data 105 (e.g., the gray shaded area including the portion of error 120 and error 125 within user data 105) can include one or more records including data (in a compressed/encrypted form). The tape drive writes/reads data to the tape in datasets. The first parity 110 and second parity 115 contain error correcting code (ECC) corresponding to the user data 105. This can allow the data of the dataset 100 to be corrected if any corruptions or errors are associated with the user data 105. In embodiments, upon writing each line of user data 105 horizontally, parity 110 (C1) data (e.g., redundant data) is appended to the end of each row. Thereafter, upon writing each row of data, parity 115 (C2) is added for each completed column of user data 105 written.

In embodiments, the first parity 110, C1, corrects errors of the user data per row of data (e.g., horizontally). For example, a first error 120 associated with a row of user data 105 may be fixed/corrected by a corresponding horizontal row of the first parity 110. Similarly, the second parity 115 can be configured to correct errors occurring per column of the user data 105. For example, a second error 125 associated with a column of user data can be fixed/corrected by a corresponding vertical column of the second parity 115.

Upon correcting errors associated with the rows and columns via the first parity 110 and second parity 115, respectively, the user data 105 can be assumed to be valid and the records of the dataset 100 can be transferred to a host.

The dataset 100 can be any suitable size. In embodiments, the dataset size is fixed based on defined standards (e.g., in a format specification, such as the International Organization for Standardization (ISO)). In embodiments, the dataset 100 size is fixed based on the format specification generation. The size of the dataset 100 may vary based upon the format specification generation. In embodiments, the dataset is logically organized into a two-dimensional array, as shown in FIG. 1. As an example, the user data 105 may contain a first number of bytes horizontally (e.g., 924) and a first number of bytes vertically (e.g., 168) (924×168 bytes), the first parity 115 may contain a second number of bytes horizontally (e.g., 48) and a second number of bytes vertically (e.g., 192) (48×192 bytes), and the second parity 115 may contain a third number of bytes horizontally (e.g., 960) and a third number of bytes vertically (e.g., 24) (972×24 bytes), (e.g., amounting to a 972×216 dataset). However, any suitable size or structure of dataset 100 can be implemented. In embodiments, the size of the dataset 100 can be lesser or greater than the examples provided.

As shown in FIG. 1, the last row of the user data 105 within the dataset 100 includes a dataset information table (DSIT) 130. Various information relating to the dataset 100 is recorded in the DSIT 130. For example, the DSIT 130 can include the range of record numbers and file marks included in the dataset. This can be used during a repositioning request such that, when an area of the tape including a target data position is identified, DSIT 130 information from each dataset can be read to ascertain the presence of the target data position by referencing the record and file mark ranges indicated in the DSIT 130.

Figure 2:
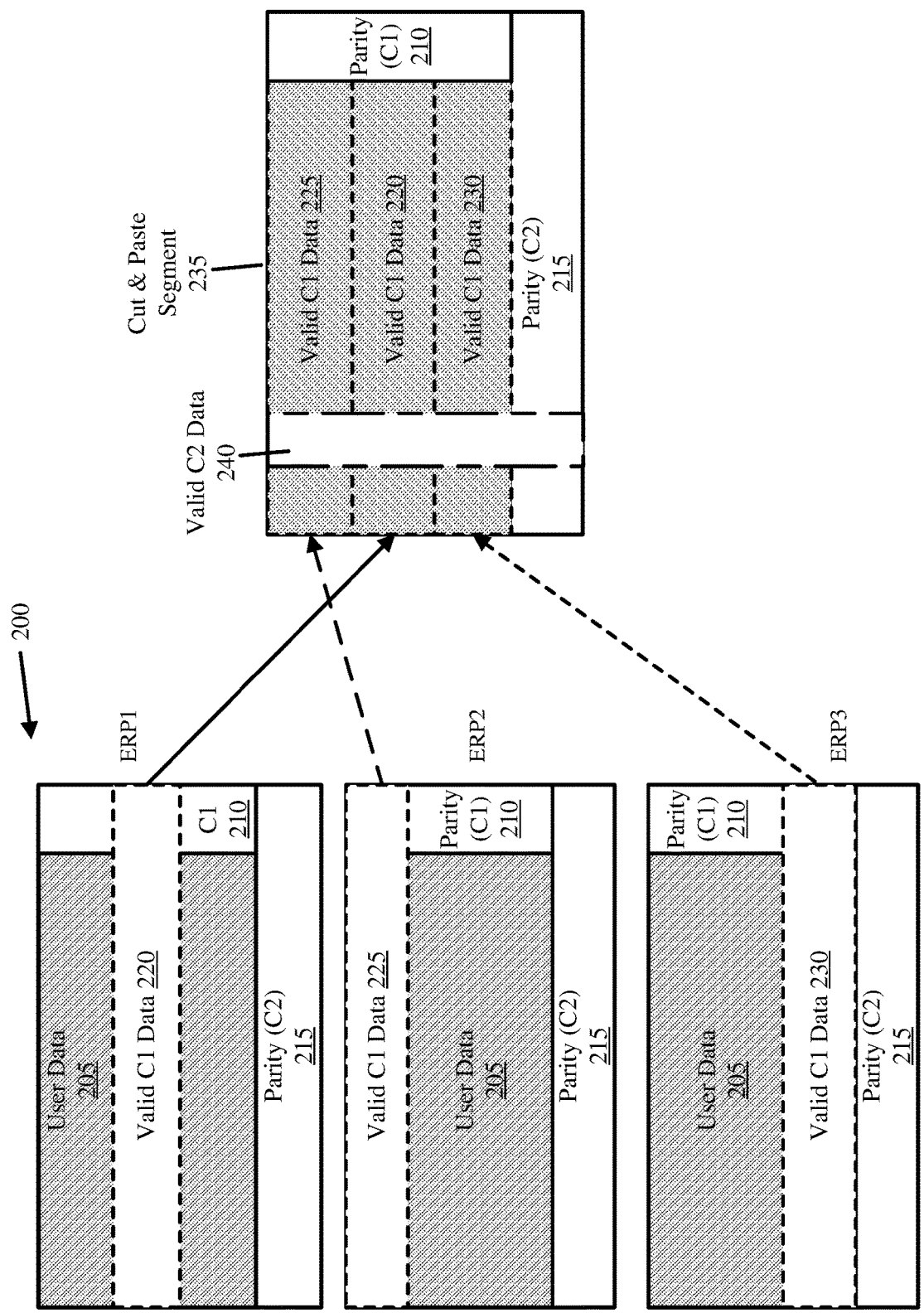
FIG. 2 is a block diagram illustrating method for generating a cut and paste segment based on a dataset, in accordance with embodiments of the present disclosure.

Referring now to FIG. 2, shown is a diagram depicting the formation of a cut and paste segment 235 based on multiple error recovery procedure (ERP) scans, in accordance with embodiments of the present disclosure.

As shown in FIG. 2, a dataset 200 is depicted with user data 205, C1 parity 210, and C2 parity 215. As discussed with respect to FIG. 1, the C1 parity 210 can be configured to correct errors within rows of the user data 205 (horizontally) and the C2 parity 215 can be configured to correct errors within columns of the user data 205 (vertically).

Within an ERP process, C1 parity 210 and C2 parity 215 can be used to determine whether data is valid or not (e.g., readable). Within the ERP process, if an error is not detected as a result of making corrections within the data (e.g., a data row or column), then that data including the C1 data and C2 data can be copied to a dedicated segment reserved on a memory buffer.

As shown in FIG. 2, a first ERP scan (ERP 1) is completed on the dataset 200 and valid C1 data 220 determined by the first ERP scan is copied from the dataset 200 to a cut and paste segment 235. That is, the entire dataset 200 is read during the first ERP scan and data which is determined to be valid based on C1 is copied to cut and paste segment 235. In embodiments, data may be copied from the dataset to the cut and paste segment 235 row by row, based on the rows of the valid C1 data 220. However, after the first ERP scan, the dataset 200 is still not readable, as there were unreadable areas within the dataset 200. Thus, a second ERP scan (ERP 2) is completed on the dataset 200 by rewinding the tape to the beginning of the dataset 200 and re-reading it as a part of the second ERP scan. During the second ERP scan, valid C1 data 225 determined by the second ERP scan is copied from the dataset 200 to the cut and paste segment 235. However, after the second ERP scan, the dataset 200 is still not readable in its entirety. As such, a third ERP scan is completed on the dataset 200 (e.g., by rewinding the tape to the beginning of the dataset 200 and re-reading) and valid C1 data 230 determined by the third ERP scan is copied from the dataset 200 to the cut and paste segment 235. This can be completed for all rows within the dataset 200 until the dataset 200 can be read. For example, a plurality of rows (hundreds, depending on the number of rows within the dataset) can be copied into the cut and paste segment 235.

If errors are not detected as a result of making corrections within data columns, then the data columns including the C2 data can also be copied to the cut and paste segment 235. For example, valid C2 data 240 can be transferred onto the cut and paste segment 235. This process demonstrates the formation of the cut and paste segment 235. Multiple ERP scans can be performed until the C1 data of the cut and paste segment 235 is corrected by the C2 215. In embodiments, the memory area for the cut and paste segment 235 is dedicated on a segment buffer (e.g., a memory buffer) initially.

In embodiments, ERP can be performed simultaneously on multiple datasets to generate multiple cut and paste segments of respective datasets. For example, 16 or 32 cut and paste segments can be simultaneously generated from 16 or 32 consecutive datasets during an ERP process. Forming multiple cut and paste segments simultaneously (e.g., at the same time or within a small window) is hereinafter referred to as "cut and paste multi."

Figure 3:
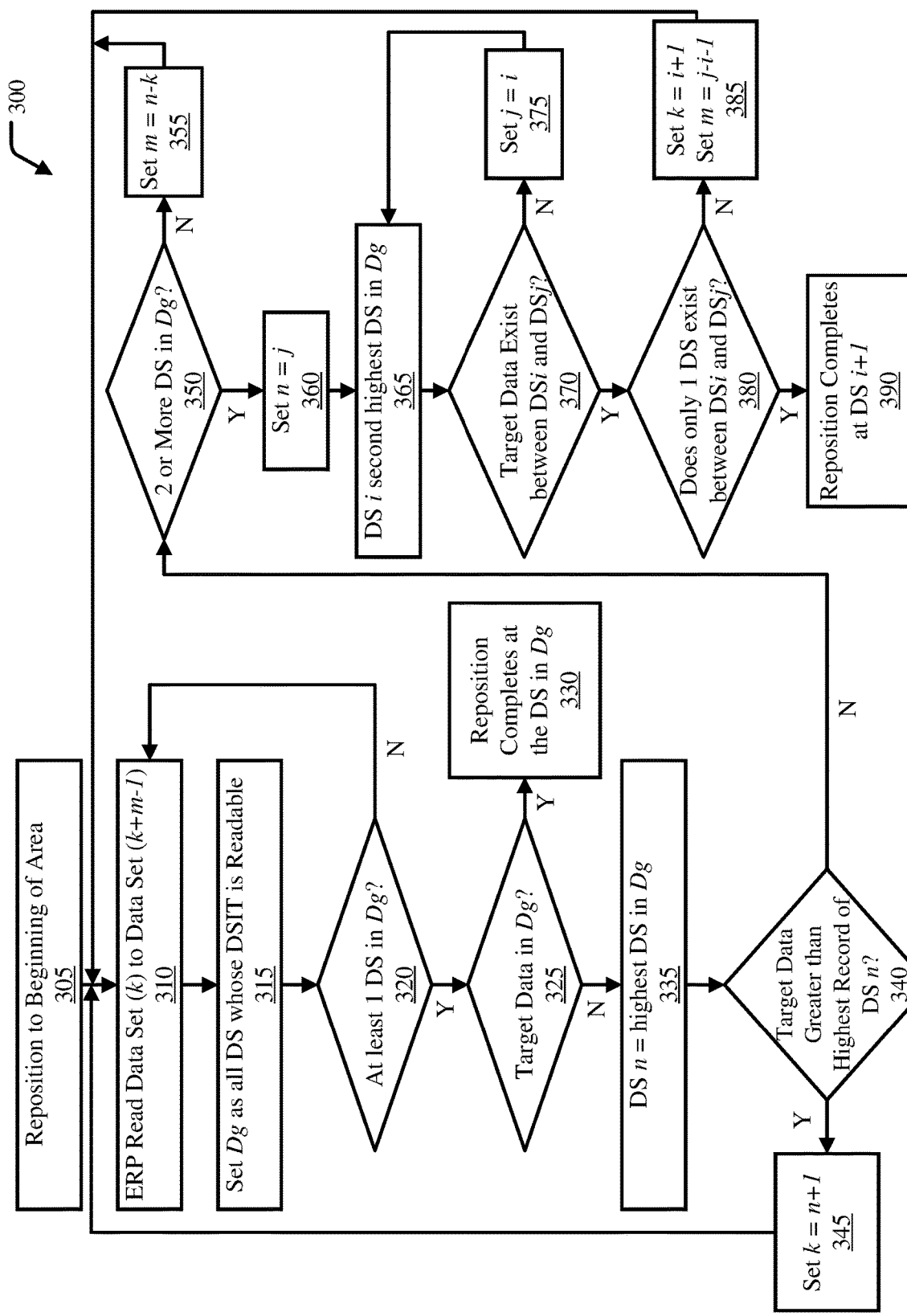
FIG. 3 is a flow-diagram illustrating an example method for repositioning using cut and paste segments, in accordance with embodiments of the present disclosure.

Referring now to FIG. 3, shown is an example method 300 for repositioning to a target data position using cut and paste segments, in accordance with embodiments of the present disclosure.

Method 300 initiates at operation 305, where a request to reposition to a target data position is received and the tape medium is repositioned to the beginning of the area containing the target data position. The request to reposition can specify a target record, file mark, or block for which a read or write operation is directed to. The tape drive can then wind the tape to the beginning of the target area (e.g., a predetermined region of a wrap, depending on the tape directory used). In embodiments, the target area for repositioning can be half of a wrap (e.g., if a normal tape directory is used). In embodiments, the target area for repositioning can be a smaller subsection of a wrap (e.g., $1/128^{th}$ of a wrap, as used in high resolution tape directory (HRTD) designs). In embodiments, the beginning of the area which the tape is repositioned to is assumed to include a dataset containing the target data position (e.g., target record).

Method 300 proceeds to operation 310, where reading, as a part of an error recovery procedure (ERP), is completed from a dataset k (e.g., a first dataset at the beginning of the area which the tape is repositioned to) to a dataset k+m−1 (e.g., a later dataset within the area, depending on the number of cut and paste multi segments generated), where m is a total number of datasets which cut and paste multi segments are generated for (e.g., 16 or 32). That is, a total number "m" of datasets for which corrections were made (e.g., using C1 and C2) and for which cut and paste segments are generated are read within the area. Thus, reading as a part of an ERP cut and paste multi operation is completed from a first dataset of the area to an $m^{th}$ dataset of the area, where m depends on the number of cut and paste multi datasets.

A group (e.g., subset) of datasets whose dataset information table (DSIT) is readable in the cut and paste segments, Dg, is then determined. This is illustrated at operation 315. As discussed with respect to FIG. 1, the DSIT is located at the last line of the data within each dataset. Therefore, all datasets having a readable DSIT within a range from dataset k (e.g., a first data set) to dataset k+m−1 (an $m^{th}$ dataset) are included within Dg.

A determination is then made whether there is at least one dataset within Dg. This is illustrated at operation 320. If there is not at least one dataset within Dg, then method 300 returns to operation 310 where ERP readings of datasets within the area can continue to be completed until a dataset having readable DSIT information is identified.

If there is at least one dataset included in Dg, then a determination is made whether the target data for which the reposition request (e.g., at operation 305) was directed to is included in Dg. This is illustrated at operation 325. As discussed above, if there is at least one dataset whose DSIT is readable within Dg, then a range of records and/or file marks can be obtained by analyzing the DSIT. As such, by reading the DSIT of the at least one dataset within Dg, a determination can be made whether the target data is within Dg.

If a determination is made that the target data is present within Dg, then repositioning completes at the dataset within Dg for which the target data is included. This is illustrated at operation 330. That is, the target for repositioning can be a dataset within Dg having readable DSIT information that is determined to include the target data position (e.g., target record) based on reading the DSIT information.

If a determination is made that the target data is not within Dg (e.g., reading DSIT information for datasets within Dg indicates that the target data is not within record ranges/file mark ranges indicated by the DSIT(s)), then the highest number dataset within Dg is set to n (e.g., "DS n"), where k≤n≤k+m−1. This is illustrated at operation 335. Thus, the highest number dataset within Dg, DS n, is between the dataset range read during ERP at operation 310.

A determination is then made whether the target data position is greater than the highest record number of DS n (e.g., given that DS n is the highest dataset within Dg, DS n is the highest dataset between dataset k and dataset k+m−1 having readable DSIT information). This is illustrated at operation 340. If a determination is made that the target data position is greater than the highest record indicated within DSIT of DS n, then in operation 345 k is set to n+1. Thereafter, operation 310 is recompleted with k set to n+1 (e.g., the next dataset after DS n is read until dataset n+m). That is, ERP readings occurs from a next data set after the DS n, DS n+1, until a dataset (n+m), DS n+m.

If a determination is made that the target data position is not greater than the highest record indicated within DSIT of DS n, then a determination is made whether there are two or more datasets within Dg. This is illustrated at operation 350. If a determination is made that there is not two or more datasets within Dg (e.g., there is only a single dataset within Dg), then m is set to n−k. This is illustrated at operation 355. Thus, if there is only a single dataset within Dg and the target data position is greater than the highest record of that dataset, ERP reading at operation 310 is recompleted from dataset k, DS k, to dataset (n−1), DS n−1.

If a determination is made that there is more than two datasets included within Dg, then the highest dataset DS n is set to j (e.g., the highest dataset having readable DSIT within Dg). This is illustrated at operation 360.

Further, an assumption is made that the second highest dataset within Dg occurring before DS n (i.e., DS j) is DS i. This is illustrated at operation 365. In embodiments, datasets may exist between DS i and DS j, however, they may not be included within Dg. That is, the datasets between DS i and DS j may not have readable DSIT information.

A determination then occurs whether the target data position exists between DS i and DS j (e.g., the second highest and highest datasets within Dg having readable DSIT information). This is illustrated at operation 370. If a determination is made that the target data does not exist between DS i and DS j, then j is set to i. This is illustrated at operation 375. In other words, the old DS i becomes the new DS j and a next dataset before the old DS i having readable DSIT information is set as the new DS i. Thereafter, a determination can be made whether the target data position exists between the new DS i and DS j. This may repeat until the target data is found to exist between the datasets within Dg.

If a determination is made that the target data does exist between DS i and DS j (e.g., the target data position specified at operation 305 is greater than the record range indicated in the DSIT for DS i and lower than the record range indicated in the DSIT for DS j), then a determination is made whether only a single dataset exists between DS i and DS j. This is illustrated at operation 380.

If a determination is made that more than one dataset exists between DS i and DS j, then k is set to (i+1) and m is set to (j−i−1). This is illustrated at operation 385. Thus, reading as a part of the ERP at operation 310 occurs between dataset i+1, DS i+1, and dataset j−1, DS j−1. As such, datasets in between DS i and DS j are read as a part of the ERP at operation 310.

If a determination is made that only a single dataset exists between DS i and DS j, then repositioning completes at DS i+1 (e.g., the dataset between DS i and DS j). This is illustrated at operation 390. This is because the target record is assumed to exist between the record range indicated in the DSIT for DS i and the record range indicated in the DSIT for DS j.

The aforementioned operations can be completed in any order and are not limited to those described. Additionally, some, all, or none of the aforementioned operations can be completed, while still remaining within the spirit and scope of the present disclosure.

Figure 4:
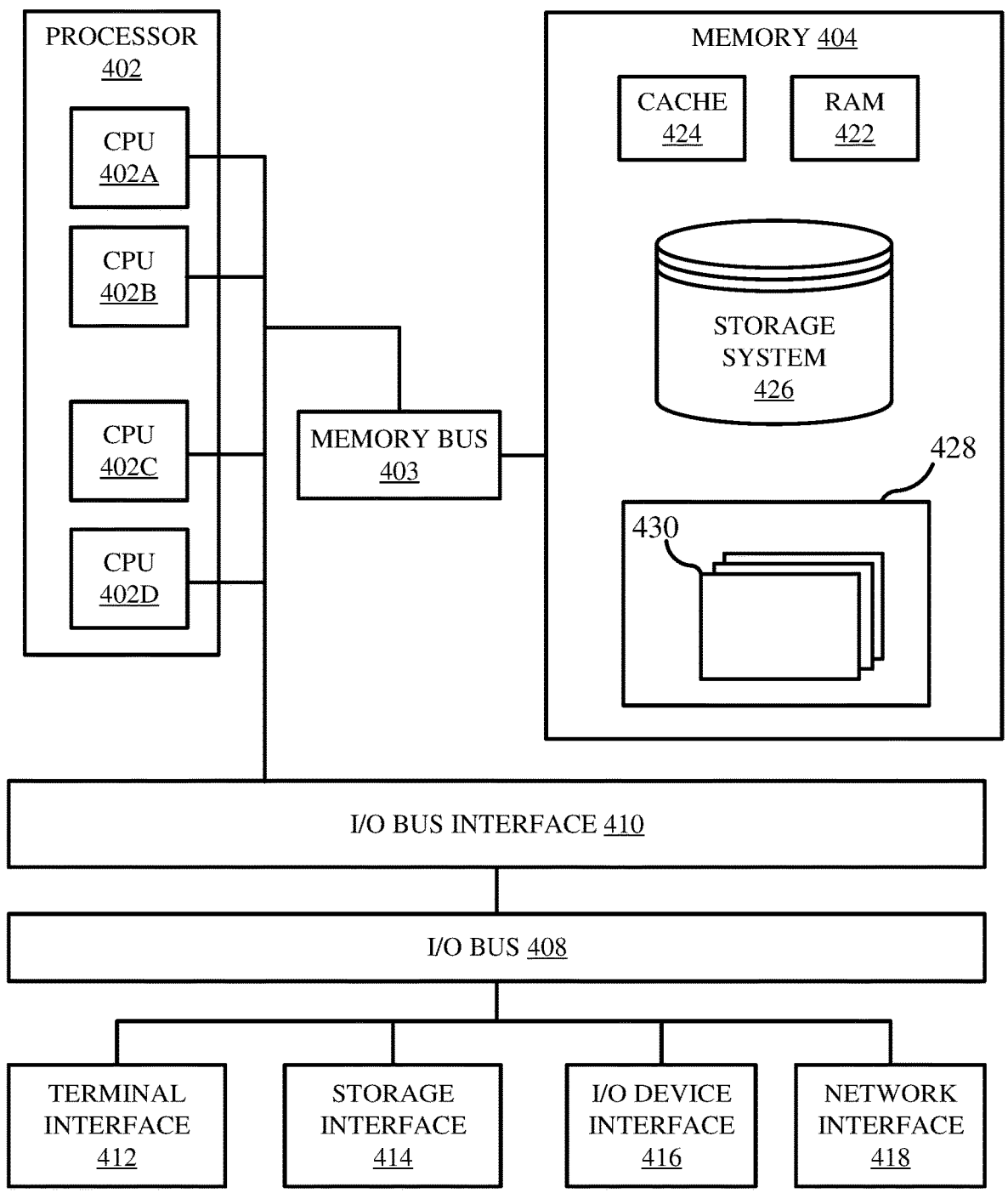
FIG. 4 is a high-level block diagram illustrating an example computer system that can be used in implementing one or more of the methods, tools, and modules, and any related functions, described herein, in accordance with embodiments of the present disclosure.

Referring now to FIG. 4, shown is a high-level block diagram of an example computer system 401 (e.g., a host computer system communicatively coupled to a linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 401 can comprise one or more CPUs 402, a memory subsystem 404, a terminal interface 412, a storage interface 416, an I/O (Input/Output) device interface 414, and a network interface 418, all of which can be communicatively coupled, directly or indirectly, for inter-component communication via a memory bus 403, an I/O bus 408, and an I/O bus interface unit 410.

The computer system 401 can contain one or more general-purpose programmable central processing units (CPUs) 402A, 402B, 402C, and 402D, herein generically referred to as the CPU 402. In some embodiments, the computer system 401 can contain multiple processors typical of a relatively large system; however, in other embodiments the computer system 401 can alternatively be a single CPU system. Each CPU 402 can execute instructions stored in the memory subsystem 404 and can include one or more levels of on-board cache.

System memory 404 can include computer system readable media in the form of volatile memory, such as random access memory (RAM) 422 or cache memory 424. Computer system 401 can further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. In embodiments, memory 404 can include a magnetic tape system. For example, the computer system 401 may be communicatively coupled to a linear tape file system (LTFS). Memory devices can be connected to memory bus 403 by one or more data media interfaces. The memory 404 can include at least one program product having a set (e.g., at least one) of program modules that are configured to carry out the functions of various embodiments.

One or more programs/utilities 428, each having at least one set of program modules 430 can be stored in memory 404. The programs/utilities 428 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 can, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices can be connected directly to one or more system I/O buses.

In some embodiments, the computer system 401 can be a multi-user mainframe computer system, a single-user system, or a server computer or similar device that has little or no direct user interface, but receives requests from other computer systems (clients). Further, in some embodiments, the computer system 401 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components can have greater or lesser complexity than as represented in FIG. 4, components other than or in addition to those shown in FIG. 4 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of repositioning within a tape system, the method comprising:
   receiving a reposition request for a target data position;
   repositioning to a beginning of an area of a tape medium to which the reposition request is directed;
   reading, as a part of an error recovery procedure (ERP), a first dataset of the area to an $m^{th}$ dataset of the area as a part of a cut and paste multi operation, where m is a number of datasets for which cut and paste multi segments are to be generated;
   generating cut and paste segments for each of the datasets in a range of the first dataset and the $m^{th}$ dataset;
   determining, by analyzing the cut and paste segments, a subset of datasets within the range of the first dataset to the $m^{th}$ dataset having readable dataset information table (DSIT) information; and
   determining whether the target data position is included within the subset of datasets within the range of the first dataset to the $m^{th}$ dataset by reading the DSIT information.

2. The method of claim 1, further comprising:
   determining that the target data position is included within the subset of datasets within the range of the first dataset to the $m^{th}$ dataset by reading the DSIT information; and
   repositioning at the target data position based on the DSIT information.

3. The method of claim 1, further comprising:
   determining that the target data position is not included within the subset of datasets within the range of the first dataset to the $m^{th}$ dataset by reading the DSIT information;
   determining that the target data position is greater than a highest record number of a highest dataset within the subset of datasets within the range of the first dataset to the $m^{th}$ dataset having readable DSIT information; and
   performing ERP reading at a next dataset after the highest dataset.

4. The method of claim 1, further comprising:
   determining that the target data position is not included within the subset of datasets within the range of the first dataset to the $m^{th}$ dataset by reading the DSIT information;
   determining that the target data position is not greater than a highest record number of a highest dataset within the subset of datasets within the range of the first dataset to the $m^{th}$ dataset having readable DSIT information;
   determining that only one dataset exists within the subset of datasets within the range of the first dataset to the $m^{th}$ dataset having readable DSIT information; and
   performing ERP reading between a second range of the first dataset to a second dataset, the second dataset being one less than the highest dataset.

5. The method of claim 1, further comprising:
   determining that the target data position is not included within the subset of datasets within the range of the first dataset to the $m^{th}$ dataset by reading the DSIT information;
   determining that the target data position is not greater than a highest record number of a highest dataset within the subset of datasets within the range of the first dataset to the $m^{th}$ dataset having readable DSIT information;
   determining that at least two datasets exist within the subset of datasets within the range of the first dataset to the $m^{th}$ dataset having readable DSIT information; and
   determining whether the target data position exists between a second highest dataset and the highest dataset within the subset of datasets within the range of the first dataset to the $m^{th}$ dataset having readable DSIT information.

6. The method of claim 5, further comprising:
   determining that the target data position exists between the second highest dataset and the highest dataset within the subset of datasets within the range of the first dataset to the $m^{th}$ dataset having readable DSIT information;
   determining that only a single dataset exists between the second highest dataset and the highest dataset; and
   completing repositioning at the single dataset between the second highest dataset and the highest dataset.

7. The method of claim 5, further comprising:
   determining that the target data position exists between the second highest dataset and the highest dataset within the subset of datasets within the range of the first dataset to the $m^{th}$ having readable DSIT information;
determining that more than one dataset exists between the second highest dataset and the highest dataset; and
performing ERP reading between a next dataset after the second highest dataset and a preceding dataset before the highest dataset.

8. A system comprising:
a tape system having a tape medium;
one or more processors; and
one or more computer-readable storage media collectively storing program instructions which, when executed by the one or more processors, are configured to cause the one or more processors to perform a method of repositioning within the tape system, the method comprising:
receiving a reposition request for a target data position;
repositioning to a beginning of an area of the tape medium to which the reposition request is directed;
reading, as a part of an error recovery procedure (ERP), a first dataset of the area to an $m^{th}$ dataset of the area as a part of a cut and paste multi operation, where m is a number of datasets for which cut and paste multi segments are to be generated;
generating cut and paste segments for each of the datasets in a range of the first dataset and the $m^{th}$ dataset;
determining, by analyzing the cut and paste segments, a subset of datasets within the range of the first dataset to the $m^{th}$ dataset having readable dataset information table (DSIT) information; and
determining whether the target data position is included within the subset of datasets within the range of the first dataset to the $m^{th}$ dataset by reading the DSIT information.

9. The system of claim 8, wherein the method performed by the one or more processors further comprises:
determining that the target data position is included within the subset of datasets within the range of the first dataset to the $m^{th}$ dataset by reading the DSIT information; and
repositioning at the target data position based on the DSIT information.

10. The system of claim 8, wherein the method performed by the one or more processors further comprises:
determining that the target data position is not included within the subset of datasets within the range of the first dataset to the $m^{th}$ dataset by reading the DSIT information;
determining that the target data position is greater than a highest record number of a highest dataset within the subset of datasets within the range of the first dataset to the $m^{th}$ dataset having readable DSIT information; and
performing ERP reading at a next dataset after the highest dataset.

11. The system of claim 8, wherein the method performed by the one or more processors further comprises:
determining that the target data position is not included within the subset of datasets within the range of the first dataset to the $m^{th}$ dataset by reading the DSIT information;
determining that the target data position is not greater than a highest record number of a highest dataset within the subset of datasets within the range of the first dataset to the $m^{th}$ dataset having readable DSIT information;
determining that only one dataset exists within the subset of datasets within the range of the first dataset to the $m^{th}$ dataset having readable DSIT information; and
performing ERP reading between a second range of the first dataset to a second dataset, the second dataset being one less than the highest dataset.

12. The system of claim 8, wherein the method performed by the one or more processors further comprises:
determining that the target data position is not included within the subset of datasets within the range of the first dataset to the $m^{th}$ dataset by reading the DSIT information;
determining that the target data position is not greater than a highest record number of a highest dataset within the subset of datasets within the range of the first dataset to the $m^{th}$ dataset having readable DSIT information;
determining that at least two datasets exist within the subset of datasets within the range of the first dataset to the $m^{th}$ dataset having readable DSIT information; and
determining whether the target data position exists between a second highest dataset and the highest dataset within the subset of datasets within the range of the first dataset to the $m^{th}$ dataset having readable DSIT information.

13. The system of claim 12, wherein the method performed by the one or more processors further comprises:
determining that the target data position exists between the second highest dataset and the highest dataset within the subset of datasets within the range of the first dataset to the $m^{th}$ dataset having readable DSIT information;
determining that only a single dataset exists between the second highest dataset and the highest dataset; and
completing repositioning at the single dataset between the second highest dataset and the highest dataset.

14. The system of claim 12, wherein the method performed by the one or more processors further comprises:
determining that the target data position exists between the second highest dataset and the highest dataset within the subset of datasets within the range of the first dataset to the $m^{th}$ having readable DSIT information;
determining that more than one dataset exists between the second highest dataset and the highest dataset; and
performing ERP reading between a next dataset after the second highest dataset and a preceding dataset before the highest dataset.

15. A computer program product comprising one or more computer readable storage media, and program instructions collectively stored on the one or more computer readable storage media, the program instructions comprising instructions configured to cause one or more processors to perform a method of repositioning within a tape system, the method comprising:
receiving a reposition request for a target data position;
repositioning to a beginning of an area of a tape medium to which the reposition request is directed;
reading, as a part of an error recovery procedure (ERP), a first dataset of the area to an $m^{th}$ dataset of the area as a part of a cut and paste multi operation, where m is a number of datasets for which cut and paste multi segments are to be generated;
generating cut and paste segments for each of the datasets in a range of the first dataset and the $m^{th}$ dataset;
determining, by analyzing the cut and paste segments, a subset of datasets within the range of the first dataset to the $m^{th}$ dataset having readable dataset information table (DSIT) information; and determining whether the target data position is included within the subset of datasets within the range of the first dataset to the $m^{th}$ dataset by reading the DSIT information.

16. The computer program product of claim 15, wherein the method performed by the one or more processors further comprises:
   determining that the target data position is included within the subset of datasets within the range of the first dataset to the $m^{th}$ dataset by reading the DSIT information; and
   repositioning at the target data position based on the DSIT information.

17. The computer program product of claim 15, wherein the method performed by the one or more processors further comprises:
   determining that the target data position is not included within the subset of datasets within the range of the first dataset to the $m^{th}$ dataset by reading the DSIT information;
   determining that the target data position is greater than a highest record number of a highest dataset within the subset of datasets within the range of the first dataset to the $m^{th}$ dataset having readable DSIT information; and
   performing ERP reading at a next dataset after the highest dataset.

18. The computer program product of claim 15, wherein the method performed by the one or more processors further comprises:
   determining that the target data position is not included within the subset of datasets within the range of the first dataset to the $m^{th}$ dataset by reading the DSIT information;
   determining that the target data position is not greater than a highest record number of a highest dataset within the subset of datasets within the range of the first dataset to the $m^{th}$ dataset having readable DSIT information;
   determining that only one dataset exists within the subset of datasets within the range of the first dataset to the $m^{th}$ dataset having readable DSIT information; and
   performing ERP reading between a second range of the first dataset to a second dataset, the second dataset being one less than the highest dataset.

19. The computer program product of claim 15, wherein the method performed by the one or more processors further comprises:
   determining that the target data position is not included within the subset of datasets within the range of the first dataset to the $m^{th}$ dataset by reading the DSIT information;
   determining that the target data position is not greater than a highest record number of a highest dataset within the subset of datasets within the range of the first dataset to the $m^{th}$ dataset having readable DSIT information;
   determining that at least two datasets exist within the subset of datasets within the range of the first dataset to the $m^{th}$ dataset having readable DSIT information; and
   determining whether the target data position exists between a second highest dataset and the highest dataset within the subset of datasets within the range of the first dataset to the $m^{th}$ dataset having readable DSIT information.

20. The computer program product of claim 19, wherein the method performed by the one or more processors further comprises:
   determining that the target data position exists between the second highest dataset and the highest dataset within the subset of datasets within the range of the first dataset to the $m^{th}$ dataset having readable DSIT information;
   determining that only a single dataset exists between the second highest dataset and the highest dataset; and
   completing repositioning at the single dataset between the second highest dataset and the highest dataset.

* * * * *